US008134503B2

(12) United States Patent
Na et al.

(10) Patent No.: US 8,134,503 B2
(45) Date of Patent: Mar. 13, 2012

(54) OPEN-LOOP BEAMFORMING MIMO COMMUNICATIONS IN FREQUENCY DIVISION DUPLEX SYSTEMS

(75) Inventors: Yanxin Na, Plano, TX (US); Hang Jin, Plano, TX (US)

(73) Assignee: Cisco Technology, Inc., San Jose, CA (US)

(*) Notice: Subject to any disclaimer, the term of this patent is extended or adjusted under 35 U.S.C. 154(b) by 420 days.

(21) Appl. No.: 12/403,533

(22) Filed: Mar. 13, 2009

(65) Prior Publication Data
US 2009/0323847 A1 Dec. 31, 2009

Related U.S. Application Data

(63) Continuation-in-part of application No. 12/164,335, filed on Jun. 30, 2008, now Pat. No. 7,884,763.

(51) Int. Cl.
*H01Q 1/00* (2006.01)
(52) U.S. Cl. ....................................... 342/370
(58) Field of Classification Search .......... 342/368–377; 370/343
See application file for complete search history.

(56) References Cited

U.S. PATENT DOCUMENTS

| | | | |
|---|---|---|---|
| 6,266,528 B1 * | 7/2001 | Farzaneh | 342/372 |
| 6,392,596 B1 | 5/2002 | Lin et al. | |
| 6,694,155 B1 * | 2/2004 | Chin et al. | 455/562.1 |
| 7,359,733 B2 * | 4/2008 | Liang et al. | 342/372 |
| 2006/0007043 A1 * | 1/2006 | Xin | 342/417 |
| 2009/0066577 A1 | 3/2009 | Kim et al. | |

FOREIGN PATENT DOCUMENTS

| | | |
|---|---|---|
| EP | 1087545 A1 | 3/2001 |
| WO | 2008065462 A3 | 6/2008 |

OTHER PUBLICATIONS

Partial PCT International Search Report in International Application No. PCT/US2009/042047, dated Aug. 5, 2009.
Jindal N., "MIMO Broadcast Channels With Finite-Rate Feedback", Information Theory, IEEE Transactions on, vol. 52, No. 11, pp. 5045-5060, Nov. 2006.

* cited by examiner

*Primary Examiner* — Thomas Tarcza
*Assistant Examiner* — Fred H Mull
(74) *Attorney, Agent, or Firm* — Edell, Shapiro & Finnan, LLC

(57) ABSTRACT

Techniques are provided for wireless communication between a first wireless communication device and a second wireless communication device. At a plurality of antennas of the first wireless communication device, one or more signals transmitted by a second wireless communication device in a first frequency band are received. Beamforming weights are computed from information derived from the signals received at the plurality of antennas using one or more of a plurality of methods without feedback information from the second wireless communication device about a wireless link from the first wireless communication device to the second wireless communication device. The beamforming weights are applied to at least one transmit signal to beamform the at least one transmit signal for transmission to the second wireless communication device in a second frequency band.

23 Claims, 10 Drawing Sheets

FIG. 1
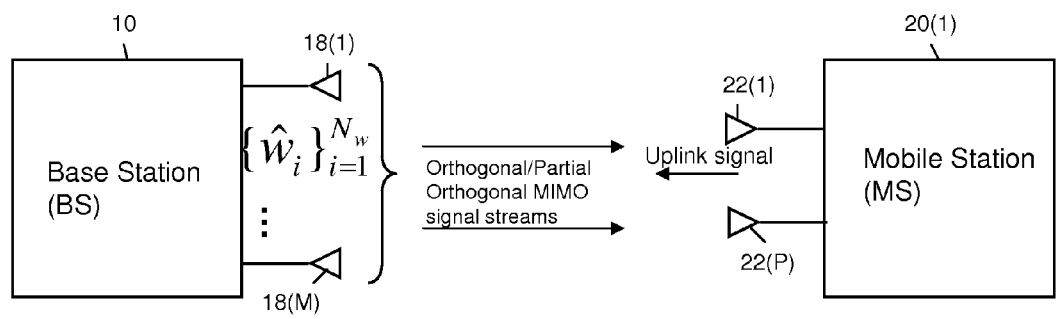
BS computes sequence of orthogonal/partial orthogonal beamforming weights $\{\hat{w}_i\}_{i=1}^{N_w}$ from uplink signals and applies them to MIMO $N_w$ signal streams
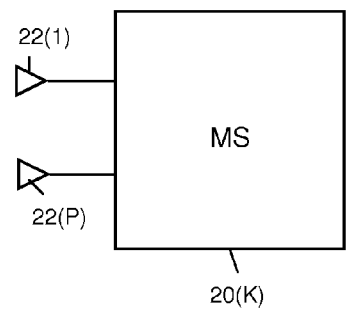

- Compute average uplink channel covariance based on received uplink signals — 222
- Compute eigenvectors of the average uplink channel covariance matrix — 224
- Compute values for plurality of candidate beamforming weight vectors based on weighted linear combination of the eigenvectors — 226

- Compute average uplink channel covariance based on received uplink signals — 232
- Compute downlink channel covariance from uplink channel covariance using transformation matrix — 234
- Compute values for plurality of candidate beamforming weight vectors based on weighted linear combination of the eigenvectors — 236

OPEN-LOOP BEAMFORMING MIMO COMMUNICATIONS IN FREQUENCY DIVISION DUPLEX SYSTEMS

CROSS REFERENCE TO RELATED APPLICATION

This application is a continuation-in-part of U.S. application Ser. No. 12/164,335, filed Jun. 30, 2008, and entitled "Orthogonal/Partial Orthogonal Beamforming Weight Generation For MIMO Wireless Communication," the entirety of which is incorporated herein by reference.

TECHNICAL FIELD

The present disclosure relates to wireless communication devices and systems and more particularly to beamforming in frequency division duplex wireless communication systems.

BACKGROUND

In wireless communication systems, antenna arrays are used at devices on one or both ends of a communication link to suppress multipath fading and interference and to increase system capacity by supporting multiple co-channel users and/or higher data rate transmissions. In a frequency division duplex (FDD) system, configuring a base station equipped with an antenna array to achieve improved downlink multiple-input multiple-output (MIMO) transmission performance is more difficult than improving the performance on an associated uplink due to a lack of information of estimated downlink channel coefficients. In general, a downlink channel covariance can be used to determine the downlink beamforming weights. However, in many situations an uplink channel covariance cannot be used to compute predicted or candidate downlink beamforming weights. In a FDD wireless communication system, the base station may not have the instantaneous downlink channel covariance matrix unless there is feedback information provided by a mobile station to the base station. Feedback of downlink channel information increases the overhead placed on the communication channel and therefore reduces the uplink channel capacity. Thus, it is preferable to avoid the reliance on feedback information when possible.

BRIEF DESCRIPTION OF THE DRAWINGS

FIG. 1 is a block diagram showing an example of a wireless communication system in which a first communication device (e.g., base station) transmits multiple signals streams to a second communication device (e.g., mobile station) using orthogonal/partially orthogonal beamforming weight vectors.

FIGS. 4-9 are examples of flow charts for various methods that are useful to compute candidate beamforming weight vectors from which the orthogonal/partially orthogonal beamforming weight vectors are computed.

DESCRIPTION OF EXAMPLE EMBODIMENTS

Overview

Figure 2:
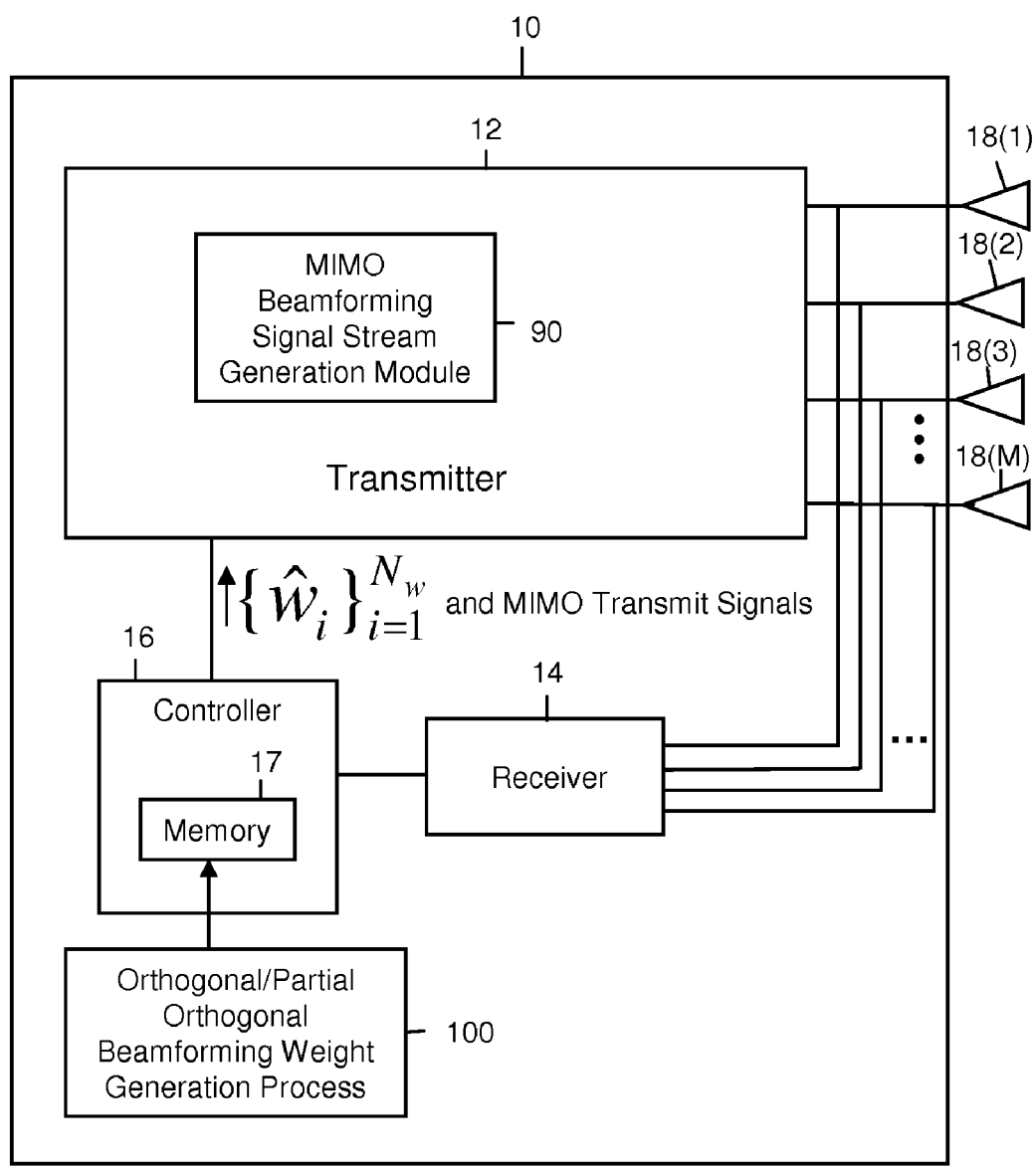
FIG. 2 is an example of a block diagram of a wireless communication device (e.g., base station) that is configured to compute orthogonal/partially orthogonal beamforming weight vectors.

Techniques are provided for wireless communication between a first wireless communication device and a second wireless communication device. At a plurality of antennas of the first wireless communication device, one or more signals transmitted by a second wireless communication device in a first frequency band are received. Beamforming weights are computed from information derived from the signals received at the plurality of antennas using one or more of a plurality of methods without feedback information from the second wireless communication device about a wireless link from the first wireless communication device to the second wireless communication device. The beamforming weights are applied to at least one transmit signal to beamform the at least one transmit signal for transmission to the second wireless communication device in a second frequency band.

Referring first to FIG. 1, a wireless radio communication system or network is shown generally at reference numeral 5 and comprises a first communication device, e.g., a base station (BS) 10, and a plurality of second communication devices, e.g., mobile stations (MS's) 20(1)-20(K). The BS 10 may connect to other wired data network facilities (not shown) and in that sense serves as a gateway or access point through which the MS's 20(1)-20(K) have access to those data network facilities.

The BS 10 comprises a plurality of antennas 18(1)-18(M) and the MS's 20(1)-20(K) may also comprise a plurality of antennas 22(1)-22(P). The BS 10 may wirelessly communicate with individual ones of the MS's 20(1)-20(K) using a wideband wireless communication protocol in which the bandwidth is much larger than the coherent frequency bandwidth. An example of such a wireless communication protocol is the IEEE 802.16 communication standard, also known commercially as WiMAX™.

Techniques are provided herein to compute values for beamforming weights that a first communication device, e.g., the BS 10, uses for multiple-input multiple-output (MIMO) wireless communication of multiple signal streams to a second communication device, e.g., MS 20(1). The BS 10 generates the beamforming weights based on the uplink channel information from the MS 20(1).

The following description makes reference to generating beamforming weights for a MIMO transmission process in frequency division duplex (FDD) or time division duplex (TDD) orthogonal frequency division multiple access (OFDMA) systems as an example only. These techniques may easily be extended to processes of beamforming weights generation in any FDD/TDD MIMO wireless communication system. The approach described herein uses relatively low complexity (and thus requires reduced processing resources) that can significantly improve the process of downlink beamforming in macrocell/microcell FDD/TDD MIMO systems in multipath environments.

Generally, the BS 10 computes a sequence of orthogonal or partially orthogonal (orthogonal/partially orthogonal) beamforming weights $\{\hat{w}_i\}_{i=1}^{N_w}$ from uplink signals that it receives from a MS, e.g., MS 20(1) and applies them to $N_w$ signal streams for MIMO transmission via antennas 18(1)-18(M) to the MS 20(1). The beamforming weights $\{\hat{w}_i\}_{i=1}^{N_w}$ are generated using a combination of one or more prediction processes and an orthogonal computation process so that the beamforming weights are orthogonal or at least partially orthogonal. The beamforming weights $\{\hat{w}_i\}_{i=1}^{N_w}$ can be used for space-time code (STC) transmission or MIMO transmission.

Turning to FIG. 2, an example of a block diagram is shown that there is a wireless communication device that may serve as a BS 10. The BS 10 comprises a transmitter 12, a receiver 14 and a controller 16. The controller 16 supplies the data to the transmitter 12 to be transmitted and processes signals received by the receiver 14. In addition, the controller 16 performs other transmit and receive control functionality. Part of the functions of the transmitter 12, receiver 14 and controller 16 may be implemented in a modem and other parts of the transmitter 12 and receiver 14 may be implemented in radio transmitter and radio transceiver circuits. It should be understood that there are analog-to-digital converters (ADCs) and digital-to-analog converters (DACs) in the various signal paths to convert between analog and digital signals.

The transmitter 12 may comprise individual transmitter circuits that supply respective upconverted signals to corresponding ones of a plurality of antennas (antennas 18(1)-18 (M)) for transmission. To this end, the transmitter 12 comprises a MIMO beamforming signal stream generation module 90 that applies the sequence of beamforming weights $\{\hat{w}_i\}_{i=1}^{N_w}$ (supplied to it by the controller 16) to $N_w$ multiple signal streams to be transmitted via antennas 18(1)-18(M). The receiver 14 receives the signals detected by each of the antennas 18(1)-18(M) and supplies corresponding antenna-specific receive signals to controller 16. It is understood that the receiver 14 may comprise a plurality of receiver circuits, each for a corresponding one of a plurality of antennas. For simplicity, these individual receiver circuits and individual transmitter circuits are not shown.

The controller 16 comprises a memory 17 or other data storage block that stores data used for the techniques described herein. The memory 17 may be separate or part of the controller 16. Instructions for performing an orthogonal/partial orthogonal beamforming weight generation process 100 may be stored in the memory 17 for execution by the controller 16. The process 100 generates the sequence of beamforming weights $\{\hat{w}_i\}_{i=1}^{N_w}$ that are supplied to the transmitter 12 for use by the module 90.

The functions of the controller 16 may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 100 may be implemented with fixed logic or programmable logic (e.g., software/computer instructions executed by a processor). Moreover, the functions of the MIMO beamforming signal stream generation module 90 and the orthogonal/partial orthogonal beamforming weight generation process 100 may be performed by the same logic component, e.g., the controller 16.

A brief description of an OFDMA signaling scheme, such as the one used in a WiMAX system, is described by way of background. The OFDMA symbol structure comprises three types of subcarriers: data subcarriers for data transmission, pilot subcarriers for estimation and synchronization purposes, and null subcarriers for no transmission but used as guard bands and for DC carriers. Active (data and pilot) subcarriers are grouped into subsets of subcarriers called subchannels for use in both the uplink and downlink. For example, in a WiMAX system, the minimum frequency-time resource unit of sub-channelization is one slot, which is equal to 48 data tones (subcarriers).

Furthermore, in a WiMAX system there are two types of subcarrier permutations for sub-channelization: diversity and contiguous. The diversity permutation allocates subcarriers pseudo-randomly to form a sub-channel, and in so doing provides for frequency diversity and inter-cell interference averaging. The diversity permutations comprise a fully used subcarrier (FUSC) mode for the downlink and a partially used subcarrier (PUSC) mode for the downlink and the uplink. In the downlink PUSC mode, for each pair of OFDM symbols, the available or usable subcarriers are grouped into "clusters" containing 14 contiguous subcarriers per symbol period, with pilot and data allocations in each cluster in the even and odd symbols.

A re-arranging scheme is used to form groups of clusters such that each group is made up of clusters that are distributed throughout a wide frequency band space spanned by a plurality of subcarriers. The term "frequency band space" refers to the available frequency subcarriers that span a relatively wide frequency band in which the OFMDA techniques are used. When the FFT size L=128, a sub-channel in a group contains two (2) clusters and is made up of 48 data subcarriers and eight (8) pilot subcarriers. When the FFT size L=512, a downlink PUSC subchannel in a major group contains some data subcarriers in ten (10) clusters and is made up of 48 data subcarriers and can use forty (40) pilot subcarriers.

The data subcarriers in each group are further permutated to generate subchannels within the group. The data subcarriers in the cluster are distributed to multiple subchannels.

The techniques described herein are applicable to the downlink beamforming generation process in any MIMO wireless communication system that requires estimating accurate downlink channel coefficients, such as in FDD/TDD CDMA (code division multiple access) systems, or FDD/TDD OFDMA systems. The following description is made for a process to generate multiple downlink beamforming weights in a MIMO FDD/TDD OFDMA system, as one example. The adaptive downlink beamforming weights are generated with a combination of beamforming weight prediction and an orthogonal computation process. The multiple beamforming weights are orthogonal or partially orthogonal and may be used for space-time coding transmissions or MIMO transmissions in WiMAX system, for example.

The BS computes a channel covariance for every MS if every MS experiences different channel conditions. To do so, the BS computes estimated uplink channel coefficients in the frequency domain for a MS based on signals received from that MS, as $H_{UL}=[H_{UL,1} H_{UL,2} \ldots H_{UL,M}]^T$, where T stands for Transpose operation, 'UL' stands for uplink and M is the number of antennas at the BS. $R_{UL}$ is the uplink channel covariance $$R_{UL} = \frac{1}{N_e} \sum_{i=1}^{N_e} H_{UL,i}(H_{UL,i})^H$$

and average uplink channel covariance, where $N_e$ is the number of received signals ($[1,\infty)$) with the same direction of arrivals (DOAs) during a coherence time interval (i.e., the time interval during which phase and magnitude of a propagating wave are, on average, predictable or constant) and H stands for Hermitian operation.

Figure 3:
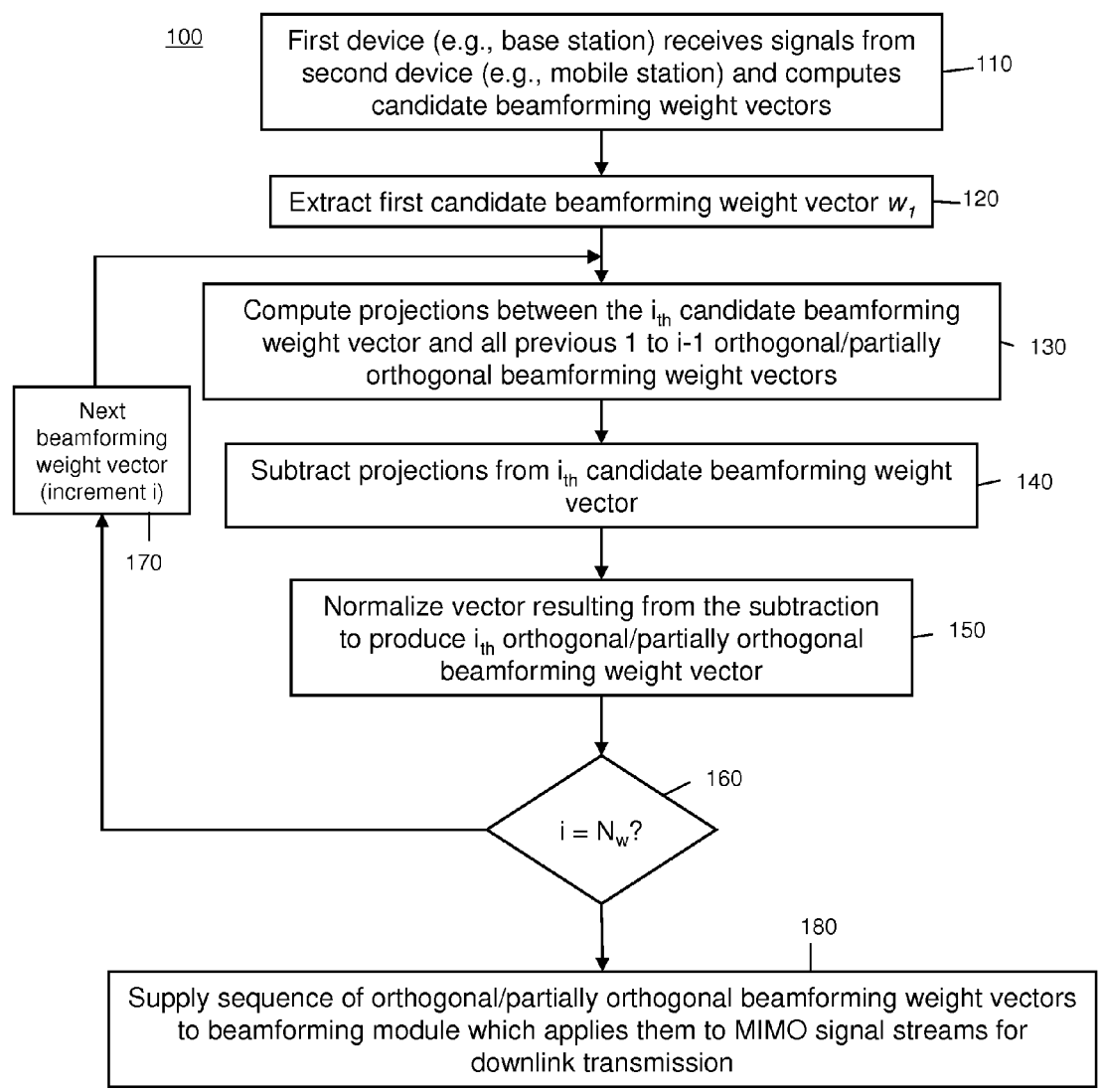
FIG. 3 is an example of a flow chart that depicts a process for computing orthogonal/partially orthogonal beamforming weight vectors.

Turning now to FIG. 3, the orthogonal/partially orthogonal beamforming weight generation process 100 is now described. At 110, the first device, e.g., BS 10, receives one or more signals at its plurality of antennas that are transmitted by a second device, e.g., a MS, and computes candidate beamforming weights from these signals. There are numerous ways to compute candidate beamforming weights from uplink signals, examples of which are described hereinafter in conjunction with FIGS. 4-9. The sequence of candidate beamforming weights are represented by a plurality of vectors referred to as candidate beamforming weight vectors $\{w_n\}_{n=1}^{N_w}$, where the total number of vectors is $N_w$, for $N_w \geq 1$ which corresponds to the number of orthogonal/partially orthogonal signal streams to be transmitted from the first device to the second device.

At 120, the first candidate beamforming weight vector $w_1$ from the sequence of candidate beamforming weight vectors $\{w_n\}_{n=1}^{N_w}$ is extracted and taken as the first in the sequence of orthogonal/partially orthogonal beamforming weight vector $\hat{w}_1$.

The functions associated with 130-170 involve computing a sequence of orthogonal/partially orthogonal beamforming weight vectors $\{\hat{w}_i\}_{i=1}^{N_w}$ from the candidate beamforming weight vectors $\{w_n\}_{n=1}^{N_w}$ computed at 110. These functions are computed for each beamforming weight vector in the sequence of orthogonal/partially orthogonal beamforming weight vectors $\{\hat{w}_i\}_{i=1}^{N_w}$.

At 130, for the $i_{th}$ orthogonal/partially orthogonal beamforming weight vector $\hat{w}_i$ (for $i \geq 2$), projections are computed between the $i_{th}$ candidate beamforming weight vector $w_i$ and all previous (1 to $i-1$) orthogonal/partially orthogonal beamforming weight vectors. This projection computation may be represented by the equation:

$$\sum_{k=1}^{i-1} \frac{\beta_{k,i} \hat{w}_k^H w_i}{norm(\hat{w}_k)} \hat{w}_k,$$

where $\alpha$ and $\beta$ are practical weighted scalars. For example, $\alpha=1.2$ and $\beta=1$, or $\alpha=1$ and $\beta=0.8$, or $\alpha=1$ and $\beta=1$. These projections constitute the spatial overlap to a candidate beamforming vector.

At 140, the projections computed at 130 are subtracted from the $i_{th}$ candidate beamforming vector:

$$\hat{w}_i = \alpha_{i,i} w_i - \sum_{k=1}^{i-1} \frac{\beta_{k,i} \hat{w}_k^H w_i}{norm(\hat{w}_k)} \hat{w}_k.$$

Thus, the result of this subtraction is a vector that is orthogonal to all of the prior vectors in the sequence $\{\hat{w}_i\}_{i=1}^{N_w}$.

At 150, the $i_{th}$ orthogonal/partially orthogonal beamforming weight vector is normalized to boost the power associated with its orthogonal portion:

$$\hat{w}_i = \hat{w}_i/\text{norm}(\hat{w}_1).$$

The functions of 130-170 are repeated for each beamforming weight vector in the sequence $\{\hat{w}_i\}_{i=1}^{N_w}$ as indicated at 160. Then, the sequence of orthogonal/partially orthogonal beamforming weight vectors $\{\hat{w}_i\}_{i=1}^{N_w}$ are supplied to the beamforming module which applies them to MIMO signal streams for transmission.

There are several methods for estimating/computing the candidate beamforming weights at 110. Examples of several methods that can be used separately or in combination are now described. In one example, a set of candidate beamforming weight vectors is computed using each of a plurality of methods or techniques to produce a plurality of sets of candidate beamforming weight vectors. Correlation rate and predicted average beamforming performance among candidate beamforming weight vectors within each set is determined and one of the plurality of sets of candidate beamforming weight vectors is selected based on the degree of correlation and predicted average beamforming performance among its candidate beamforming weight vectors. The sets of candidate beamforming weight vectors may be prioritized by the correlation rate and predicted average beamforming performance, whereby the set of candidate beamforming weight vectors with the lowest correlation and best predicted average beamforming performance is given the highest priority and the set of candidate beamforming weight vectors with the highest correlation is given the lowest priority.

Normalized Average Estimate of Uplink Channel Coefficients—Method 1

One technique to compute the candidate beamforming weights is to set the beamforming weight was the normalized average of the estimated uplink channel coefficient, $w = \overline{H}_{UL}/\text{norm}(\overline{H}_{UL})$. This method thus involves estimating the uplink channel coefficients in a frequency subchannel, normalizing the estimated channel coefficients and setting the normalized estimated channel coefficients as the candidate beamforming weights.

DOA Method—Method 2

Figure 4:
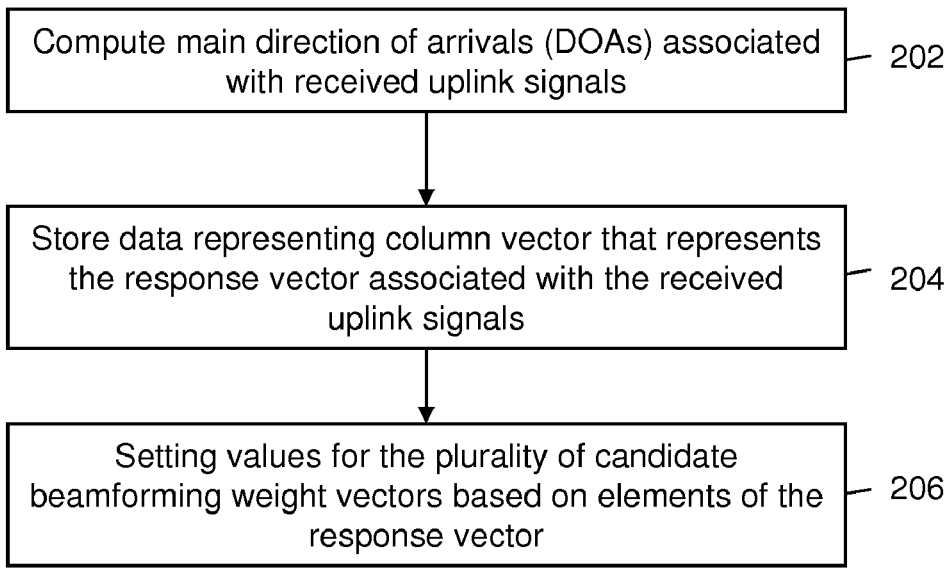

Reference is now made to FIG. 4 for a description of this method shown generally at reference numeral 200. This method uses the DOA of signals received at the plurality of antennas of the BS to compute candidate beamforming weights. At 202, based on received uplink signals, the main DOAs are estimated as $\{\theta_1, \theta_2, \ldots, \theta_L\}$. A column vector $A(\theta,\lambda)$ is defined that represents the steering vector or response vector associated with the uplink signals received at the BS antennas, where $\lambda$ is the uplink or downlink carrier wavelength ($\lambda_{UL}$ or $\lambda_{DL}$) Data representing the response vector is stored at 204. Values for the candidate beamforming weights are set based on elements of the response vector, where, for example, $w=A(\theta_1,\lambda_{DL})$ or $w=A(\theta_2,\lambda_{DL})$, ..., or $w=A(\theta_L,\lambda_{DL})$.

Use of Channel Covariance Matrix—Method 3

Figure 5:
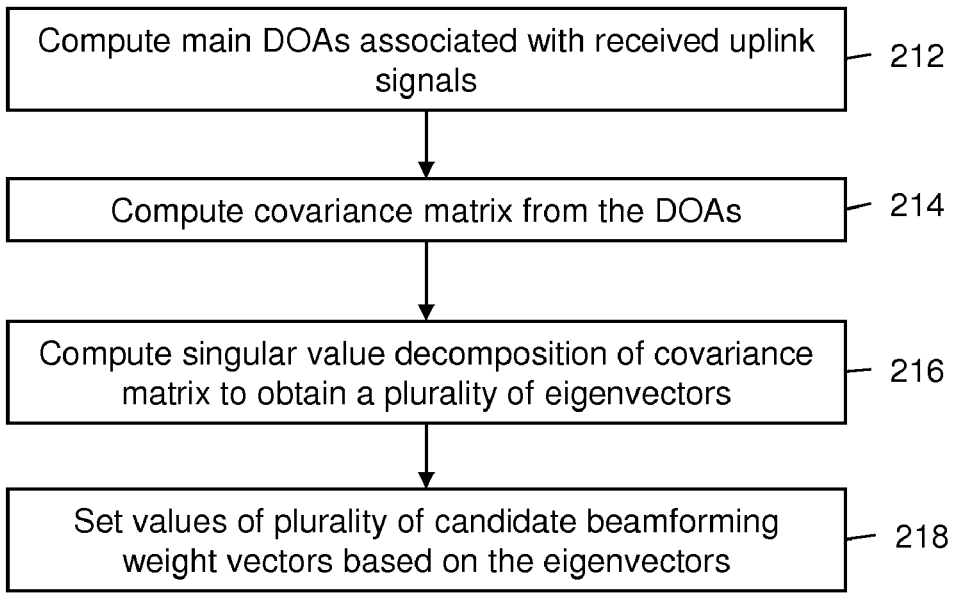

Reference is now made to FIG. 5 for a description of still another method for computing candidate beamforming weight vectors. This method, shown generally at 210, involves computing estimated main DOAs (as explained above in conjunction with FIG. 4) at 212. At 214, the main DOAs are used to generate a "new" covariance matrix $\tilde{R}=A(\theta_1,\lambda_{DL})A(\theta_1,\lambda_{DL})^H+A(\theta_2,\lambda_{DL})A(\theta_2,\lambda_{DL})^H$. Next, at 216, a singular value decomposition is computed of the new covariance matrix to obtain a plurality of eigenvectors. For example, the M eigenvectors of the generated covariance matrix $\tilde{R}$ are $\{\tilde{U}_1, \tilde{U}_2, \ldots, \tilde{U}_M\}$ corresponding to the eigenvalues $\{\tilde{\Lambda}_1, \tilde{\Lambda}_2, \ldots, \tilde{\Lambda}_M\}$ with $\tilde{\Lambda}_1 \geq \tilde{\Lambda}_2 \geq \ldots \geq \tilde{\Lambda}_M$. At 218, values for the candidate beamforming weights are set based on the eigenvectors, such as equal to the principle (or any) eigenvector of the generated covariance matrix, or the combination of eigenvectors, e.g., $\tilde{U}_1$ or/and $\tilde{U}_2$.

Another Use of Channel Covariance Matrix—Method 4

Reference is made to FIG. 6 for a description of another method for computing candidate beamforming weights. In this method, shown generally at 220, the average uplink channel covariance matrix $R_{UL}$ is computed at 222, where $$R_{UL} = \frac{1}{N_e} \sum_{i=1}^{N_e} H_{i,UL}(H_{i,UL})^H,$$

$N_e$ is the number of received signals $[1, \infty)$ with the main DOAs in the coherence time and H stands for Hermitian operation. At 224, the M eigenvectors $\{U_1, U_2, \ldots, U_M\}$ of the average uplink channel covariance matrix are computed. Then, at 226, values for the candidate beamforming weight vectors are computed based on a weighted linear combination of the eigenvectors, such as, $w = (c_1 U_1 + c_2 U_2 + \ldots + c_M U_M) / \text{norm}(c_1 U_1 + c_2 U_2 + \ldots + c_M U_M)$, where $\{c_j\}_{j=1}^M$ are complex weighting values (some of which may be set to zero).

Channel Covariance Matrix Method for FDD Systems—Method 5

Turning now to FIG. 7, another method is shown at 230 for computing the plurality of candidate downlink beamforming weight vectors in an FDD system. At 232, the uplink covariance is computed as described above in connection with FIG. 6. Then, at 234, the estimated downlink covariance $R_{DL}$ is computed from the uplink covariance as $R_{DL} = R_{UL} C_T$. $C_T$ is a constant M×M transformation matrix that is fixed after designing some system parameters that are based on the number of antennas, the spacing of the antennas, the number of spatial sectors and the uplink and downlink carrier frequencies. Thus, the transformation matrix $C_T$ is computed a priori. At 236, values for the candidate beamforming weight vectors are set based on a weighted linear combination of the eigenvectors of the average downlink channel covariance matrix $R_{DL}$, or the principal eigenvector of $R_{DL}$. For example, if the M eigenvectors of average downlink channel covariance matrix $R_{DL}$ are $\{V_1, V_2, \ldots, V_M\}$, the candidate beamforming weight w can be written as $w = (d_1 V_1 + d_2 V_2 + \ldots + d_M V_M) / \text{norm}(d_1 V_1 + d_2 V_2 + \ldots + d_M V_M)$, where $\{d_j\}_{j=1}^M$ are complex weighting values some of which may be set to zero.

Spatial Subspace Decomposition Method—Method 6

Figure 8:
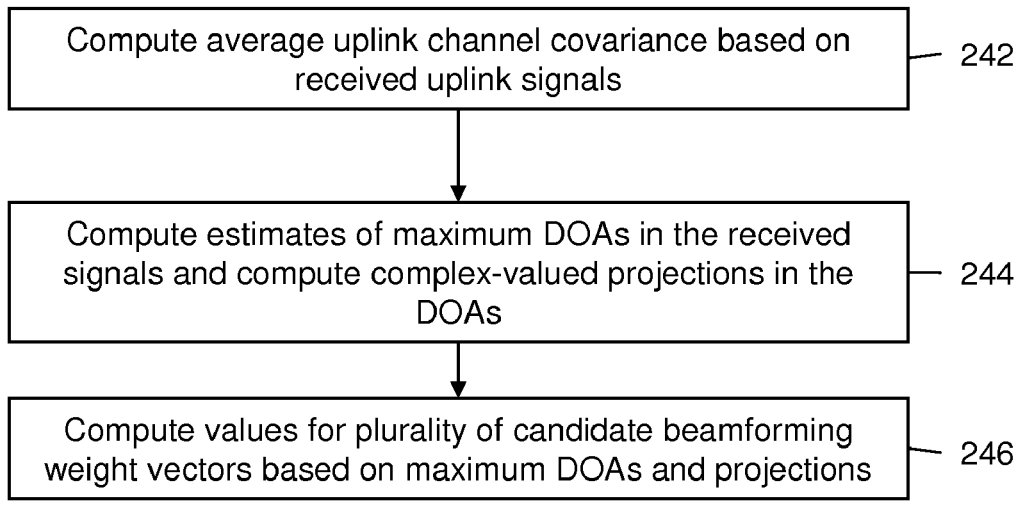

Referring to FIG. 8, another method, shown generally at 240, is described for computing the candidate beamforming weight vectors using a spatial subspace decomposition applied to the average uplink channel covariance matrix. At 242, the average uplink channel covariance matrix is computed using the computations described above. At 244, estimates of K maximum DOAs with the angles $\{\theta_1, \theta_2, \ldots \theta_K\}$ are computed from the received uplink signals and the complex-valued projections $p = [p_1, p_2, \ldots p_K]$ in the K DOAs are computed. At 246, values for the candidate beamforming weight vectors are computed from the K maximum DOAs and projections. For example, the beamforming weights are computed as $w = f_1 p_1 A(\theta_1, \lambda_{DL}) + f_2 p_2 A(\theta_2, \lambda_{DL}) + \ldots + f_K p_K A(\theta_K, \lambda_{DL})$ or $w = \text{pinv}([A(\theta_1, \lambda_{DL}) A(\theta_2, \lambda_{DL}) \ldots A(\theta_K, \lambda_{DL})]) [f_1 p_1 f_2 p_2 \ldots f_K p_K]^T$, where $\{f_k\}_{k=1}^K$ are instances of a complex random variable $\eta e^{j\beta}$, $\eta$ is a uniformly random variable with mean 1 and $\beta$ is a uniformly random variable in the range or $[0, 2\pi]$, and pinv( ) is a Pseudo-inverse operation. Thus, $\{f_k\}_{k=1}^K$, are a group of random variation variations that are applied to the complex-valued projections and K maximum DOAs. The candidate beamforming weights are then normalized. The column vector $A(\theta, \lambda)$ is defined as described above. For example, for a uniform linear array (ULA), the column vector $A(\theta, \lambda)$ is $$A(\theta, \lambda) = \begin{bmatrix} 1 & e^{j\frac{2\pi D}{\lambda} \sin(\theta)} & \ldots & e^{j\frac{2\pi D}{\lambda}(M-1)\sin(\theta)} \end{bmatrix}^T,$$

where D is the distance between two adjacent antennas, and for a uniform circular array (UCA), $$A(\theta, \lambda) = \begin{bmatrix} e^{-j\frac{2\pi r}{\lambda}\cos(\theta)} & e^{-j\frac{2\pi r}{\lambda}\cos(\theta - \frac{2\pi}{M})} & \ldots & e^{-j\frac{2\pi r}{\lambda}\cos(\theta - \frac{(M-1)2\pi}{M}))} \end{bmatrix}^T,$$

where r is the radius of the circular array.

Channel Tap-Based Method—Method 7

Figure 9:
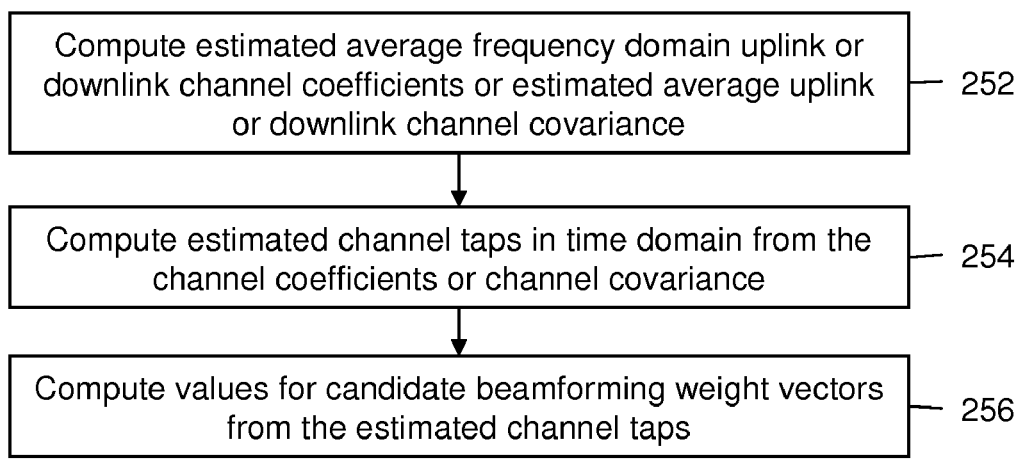

FIG. 9 illustrates still another method, shown generally at 250, for computing candidate beamforming weights using time-domain based signal analysis. First, at 252, the average frequency domain uplink/downlink channel coefficients or estimate average uplink/downlink channel covariance matrix is computed. Next, at 254, J maximum estimated channel taps in the time domain are computed as $h = [h_1 h_2 \ldots h_J]$ with the time delays $\tau = [\tau_1 \tau_2 \ldots \tau_J]$ from the channel coefficients or channel covariance, such that the channel is expressed in the form $h_1 \exp(j2\pi\tau_1 y) + h_2 \exp(j2\pi\tau_2 y) + \ldots + h_J \exp(j2\pi\tau_J y)$, where y denotes a frequency band space. For example, at 254, using pilot and/or data signals (subcarriers) or ranging signals contained in received uplink signals, estimated channel coefficients/or channel covariance matrix in different frequency bands is/are computed. The estimated channel coefficients and/or channel covariance matrix is then used to derive the time domain channel taps and time delays by least squared or minimum mean squared estimation iterative methods or other methods. Values for the candidate beamforming weight vectors for a frequency band space y are computed as $w = g_1 h_1 \exp(j2\pi\tau_1 y) + g_2 h_2 \exp(j2\pi\tau_2 y) + \ldots + g_J h_J \exp(j2\pi\tau_J y)$, where $\{g_k\}_{k=1}^J$ are instances of a complex random variable $\eta e^{j\beta}$, $\eta$ is a uniformly random variable with mean 1 and $\beta$ is a uniformly random variable in the range or $[0, 2\pi]$. The beamforming weights are then normalized. Thus, $\{g_k\}_{k=1}^J$ represent complex random factors that are applied to the estimated channel taps and time delays.

Using any one or more of the methods described above, $\xi$ beamforming weights can be computed and then those weights used to regenerate a covariance matrix, also referred to as a "new" covariance matrix. For example, the two column vectors of beamforming weights as $\{w_1, w_2\}$ are used to generate a covariance matrix $\hat{R}$ as $\hat{R} = w_1 w_1^H + w_2 w_2^H$. The singular value decomposition may then be computed on the regenerated covariance matrix to obtain the eigenvectors. New or updated values for the candidate beamforming weights may then be set as the principle (or any) eigenvector of the generated covariance matrix, or the combination of eigenvectors. If M eigenvectors of the generated covariance matrix $\hat{R}$ are $\{\hat{U}_1, \hat{U}_2, \ldots, \hat{U}_M\}$ corresponding to the eigenvalues $\{\hat{\Lambda}_1, \hat{\Lambda}_2, \ldots, \hat{\Lambda}_M\}$, then the beamforming weights may be set as $\hat{U}_1$ or/and $\hat{U}_2$.

Figure 10:
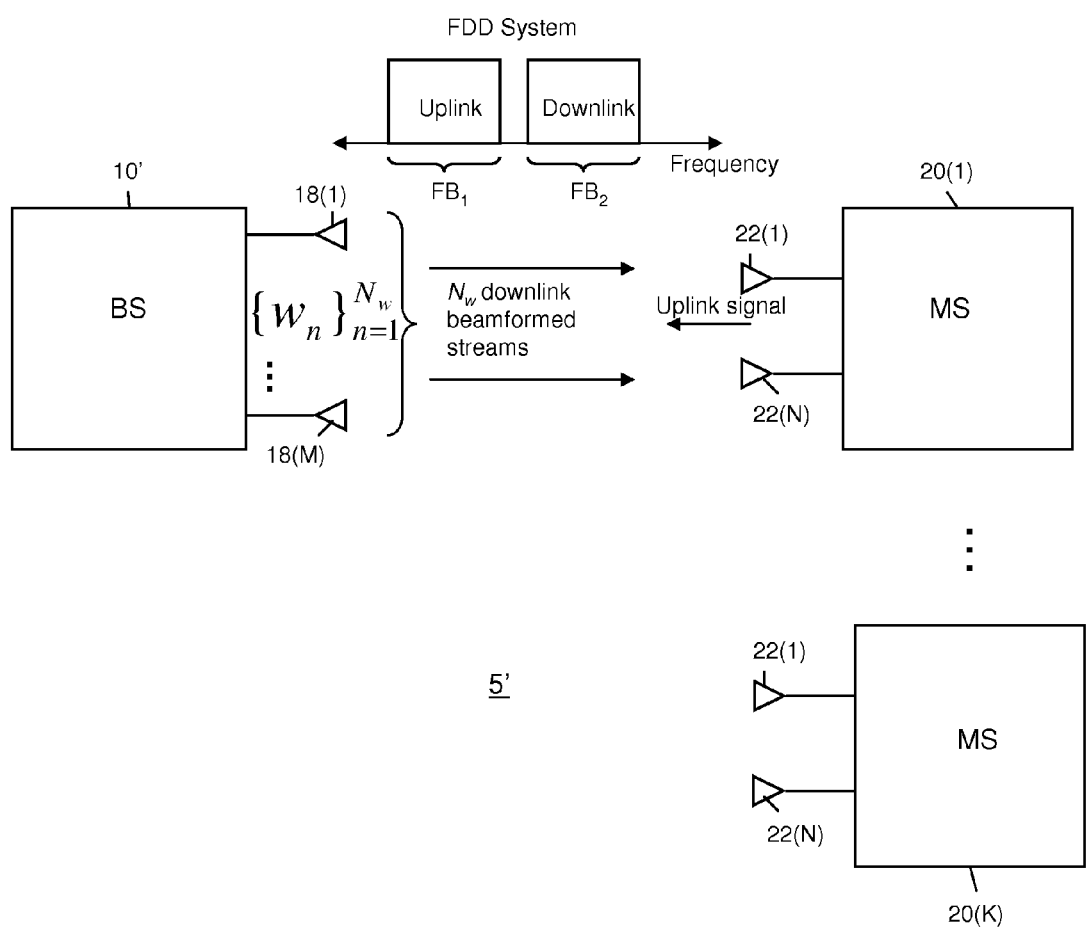
FIG. 10 is a block diagram showing an example of a frequency division duplex wireless communication system in which a base station is configured to generate beamforming weights in an open-loop fashion for beamforming signals to a mobile station.

Many of the beamforming weight computation methods described above in connection with FIGS. 4-9 are further applicable in a wireless communication system that employs FDD communication techniques, and without employing the iterative orthogonal/partial orthogonal process 100 shown in FIG. 3. An example of such a system is shown in FIG. 10 at reference numeral 5'. FIG. 10 is similar to FIG. 1, but in the FDD wireless communication system 5', the uplink transmissions and downlink transmissions are in different frequency bands as indicated in FIG. 1, and where the BS 10' does not receive feedback information from the MSs about the downlink channel. Rather, the BS' 10 is configured to derive information about the downlink channel from the uplink channel. This is known as an open-loop system.

In an FDD communication system such as that depicted in FIG. 10, the downlink and uplink transmissions are in different frequency bands (channels). For example, the uplink transmissions are in a first frequency band $FB_1$ and the DL transmissions are in a second frequency band $FB_2$. One with ordinary skill in the art understands that these different frequent bands $FB_1$ and $FB_2$ are established at baseband and are maintained when the baseband signal is upconverted for transmission. When the baseband signal is upconverted, the frequency bands $FB_1$ and $FB_2$ are within a larger frequency bandwidth or frequency "channel". Downlink and uplink transmission could overlap in time, but because they are in different frequency bands and due to the fact that the BS 10' does not have direct knowledge about the downlink channel with any given MS, techniques are provided herein to enable the BS to derive enough information about the downlink channel from received uplink signals, in order to compute beamforming weights used for beamforming transmit signals on the downlink to an MS. While the instantaneous channel coefficients are different in the downlink and uplink in FDD systems, the mean value of DOAs and power delay profile are the same in downlink and uplink in FDD systems. The uplink covariance matrix has information pertaining to DOAs and power delay, and consequently the (average) uplink covariance matrix is also useful to estimate the downlink channel conditions.

Generally, the BS 10' computes beamforming weights $\{\hat{w}_i\}_{i=1}^{N_w}$ from uplink signals that it receives from a MS, e.g., MS 20(1), and applies them to NV signal streams for MIMO transmission via antennas 18(1)-18(M) to the MS 20(1), where $N_w \gg 1$, and when ($N_w \gg 2$, this is truly a beamforming MIMO transmission. The beamforming weights $\{\hat{w}_i\}_{i=1}^{N_w}$ are generated indirectly from uplink channel information as described hereinafter.

Figure 11:
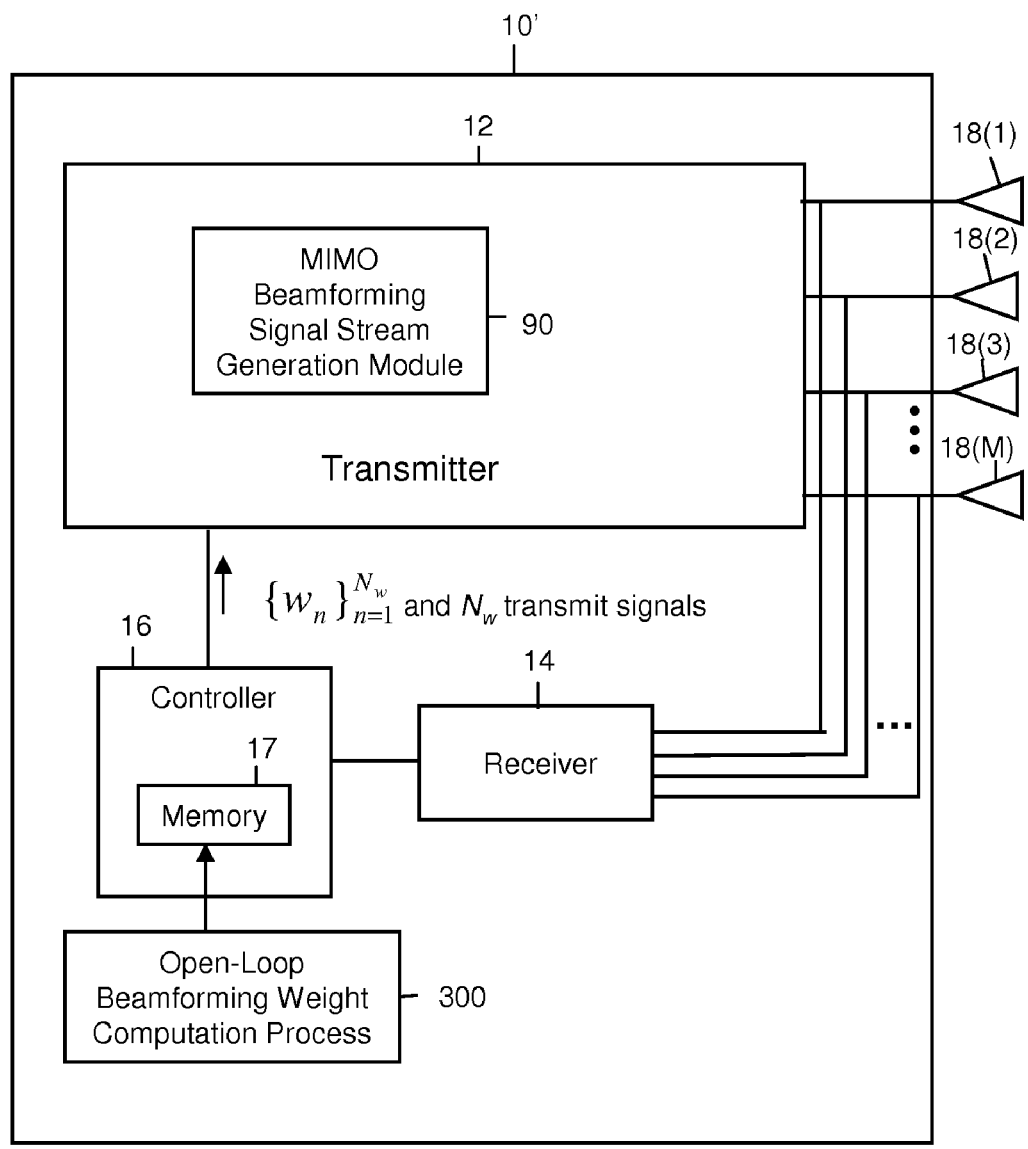
FIG. 11 is an example of a block diagram of a base station configured to generate beamforming weights in an open-loop fashion in a frequency division duplex wireless communication system.

Turning to FIG. 11, an example of a block diagram is shown for a wireless communication device that may serve as a BS 10'. This diagram is similar to FIG. 2, except that the controller 16 of the BS 10' is configured with instructions (logic) for performing an open-loop beamforming weight generation process 300. The process 300 generates the beamforming weights $\{\hat{w}_i\}_{i=1}^{N_w}$ that are supplied to the transmitter 12 for use by the module 90.

Like the BS 10 shown in FIG. 2, the functions of the controller 16 of the BS 10' may be implemented by logic encoded in one or more tangible media (e.g., embedded logic such as an application specific integrated circuit, digital signal processor instructions, software that is executed by a processor, etc.), wherein the memory 17 stores data used for the computations described herein (and/or to store software or processor instructions that are executed to carry out the computations described herein). Thus, the process 300 may be implemented with fixed logic or programmable logic (e.g., software/computer instructions executed by a processor). Moreover, the functions of the MIMO beamforming signal stream generation module 90 and the open-loop beamforming weight generation process 300 may be performed by the same logic component, e.g., the controller 16.

The BS 10' computes a channel covariance for every MS if every MS experiences different channel conditions. To do so, the BS 10' computes estimated uplink channel coefficients in the frequency domain for an MS based on signals received from that MS, as $H_{UL}=[H_{UL,1}\ H_{UL,2} \ldots H_{UL,M}]^T$, where T stands for Transpose operation, 'UL' stands for uplink and M is the number of antennas at the BS 10'. As explained above in connection with FIG. 1, $R_{UL}$ is an average uplink channel covariance $$R_{UL} = \frac{1}{N_e}\sum_{i=1}^{N_e} H_{UL,i}(H_{UL,i})^H,$$

where $N_e$ is the number of received signals ($[1, \infty)$) with the same direction of arrivals (DOAs) during a coherence time interval (i.e., the time interval during which phase and magnitude of a propagating wave are, on average, predictable or constant) and H stands for Hermitian operation.

Figure 12:
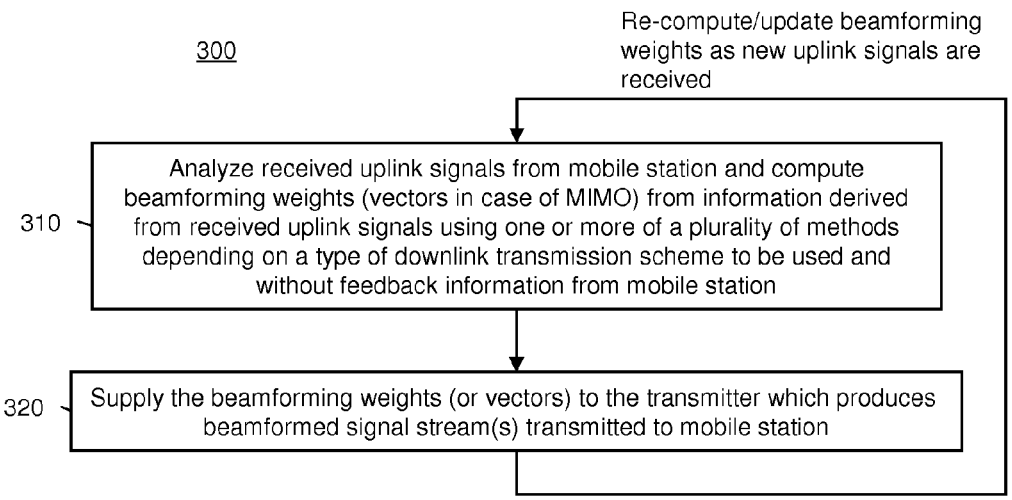
FIG. 12 is a flow chart generally depicting a process for computing beamforming weights in an open-loop manner based on received signals at the base station from a mobile station in a frequency division duplex wireless communication system.

Turning to FIG. 12, a flow chart is shown that depicts a general view of the process 300. At 310, the BS 10' receives uplink signals from a MS and analyzes them to compute beamforming weights using one or more of a plurality of methods depending on the type of downlink transmission scheme to be used and without feedback information from the BS. When multiple signal streams are to be transmitted on the downlink, then the beamforming weights consists of multiple vectors each having a dimension M, and when only a single stream is to be transmitted, the beamforming weights may be viewed as a single vector of dimension M. At 320, the beamforming weights are supplied to the transmitter 12 that produces one or more beamformed signal streams for transmission to the MS.

Figure 13:
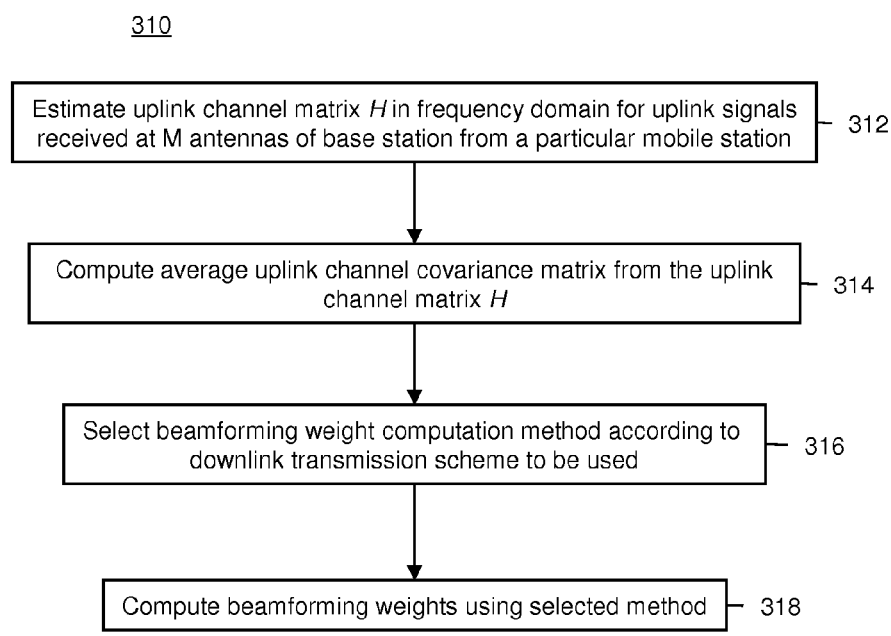
FIG. 13 is a flow chart illustrating further details of the beamforming weight computation process shown in FIG. 12.

FIG. 13 illustrates the analysis process 310 of FIG. 12 in more detail. At 312, for normal uplink traffic or ranging signals received from a given MS, the BS 10' computes an estimated uplink channel matrix $H_{UL}=[H_{UL,1}\ H_{UL,2} \ldots H_{UL,M}]^T$ in the frequency domain. Again, since the process 300 does not rely or require feedback information from the MS, the process begins using only knowledge of the uplink channel, which in an FDD system, is in a difference frequency band than the downlink channel. At 314, the BS 10' computes an average uplink channel covariance matrix $$R_{UL} = \frac{1}{N_e}\sum_{i=1}^{N_e} H_{UL,i}(H_{UL,i})^H$$

from the estimated uplink channel matrix $H_{UL}$. At 316, the BS selects a beamforming weight computation method according to the transmission scheme to be used for a downlink transmission to the MS. For example, the downlink transmission scheme may be beamforming one or more (MIMO) signal streams, spatial multiplexing (with beamforming), or space-time coding (with beamforming). At 318, a selected method, or a combination of methods, are invoked (performed) to compute the beamforming weights depending on the downlink transmission scheme to be employed by the BS 10'.

As between a first wireless communication device and a second wireless communication device, the process 300 depicted by FIGS. 12 and 13 operates generally as follows. At a plurality of antennas of a first wireless communication device, one or more signals transmitted by a second wireless communication device in a first frequency band are received. An estimated uplink channel matrix in a frequency domain is computed from the signals received at the plurality of antennas. Beamforming weights are computed from the estimated uplink channel matrix without feedback information from the second wireless communication device about a wireless link from the first wireless communication device to the second wireless communication device. The beamforming weights are applied to at least one transmit signal to beamform the at least one transmit signal for transmission to the second wireless communication device in a second frequency band.

Any one of the beamforming weight vector computation methods described above in connection with FIGS. 4-9 (or hereinafter in connection with FIG. 14) may be selected at 316 and used at 318 to compute the beamforming weights, without computing candidate beamforming weights according to the process 100 shown in FIG. 3.

Another Regenerated Covariance Matrix Method—Method 8

Figure 14:
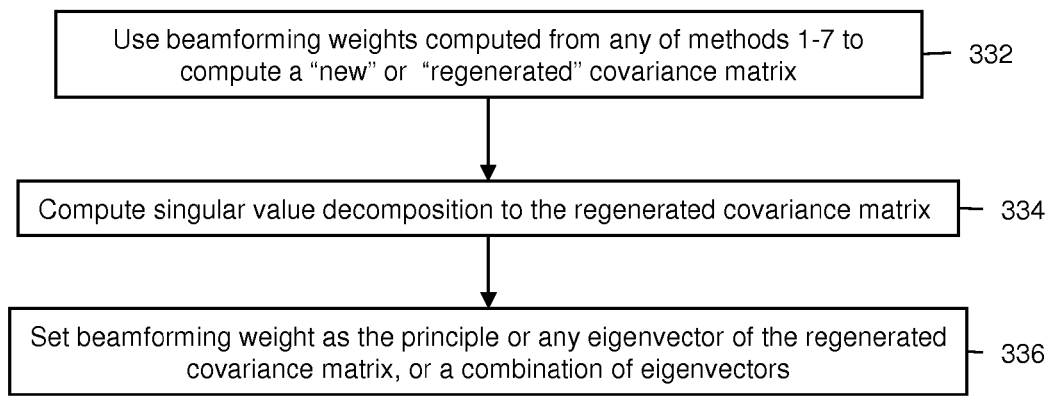
FIG. 14 is a flow chart illustrating yet another technique for computing beamforming weights that may be employed in the process shown in FIG. 12.

FIG. 14 illustrates still another beamforming computation method shown at 330 that may be selected at 316 in FIG. 14. The beamforming computation method 330 involves computing a "regenerated" covariance matrix. At 332, using any one or more of the methods 1-7 described above, ξ beamforming weights are computed and then those beamforming weights are used to compute a new or "regenerated" covariance matrix. For example, the two column vectors of beamforming weights represented as $\{w_1, w_2\}$ are used to computed a regenerated covariance matrix $\hat{R}$ as $\hat{R} = w_1 w_1^H + w_2 w_2^H$. At 334, a singular value decomposition is computed from the new or regenerated covariance matrix to obtain the eigenvectors. At 336, values for the beamforming weights are set as the principle (or any) eigenvector of the regenerated covariance matrix, or based on a combination of eigenvectors. For example, if M eigenvectors of the regenerated covariance matrix $\hat{R}$ are $\{\hat{U}_1, \hat{U}_2, \ldots, \hat{U}_M\}$ corresponding to the eigenvalues $\{\hat{\Lambda}_1, \hat{\Lambda}_2, \ldots, \hat{\Lambda}_M\}$, then the beamforming weights may be set as $\hat{U}_1$ or/and $\hat{U}_2$.

Based on any of the beamforming weight computation methods described above, a sequence of beamforming weight vectors $\{w_n\}_{n=1}^{N_w}$ may be computed where the total number of beamforming weight vectors is $N_w$, corresponding to the number of downlink transmit signal streams to be transmitted. A criteria to choose the $N_w$ beamforming weights is that the correlation between different beamforming weights, $w_{n1}^H w_{n2}$ for n1≠n2, is small.

After generating the $N_w$ beamforming weight vectors based on the methods described above, $N_w$ virtual antennas are created at the BS 10'. The $N_w$ beamforming weight vectors are applied to $N_w$ transmit signal streams to produce $N_w$ beamformed streams that are transmitted on the downlink to a MS.

The particular transmission scheme employed when transmitting the $N_w$ transmit signal streams may vary, and the method employed to compute the beamforming weights is selected according to the transmission scheme as indicated at 316 in FIG. 13. For example, when $N_w=1$, that is, only one transmit signal stream is to be transmitted from the BS to the MS, the beamforming computation method of Method 2 described above may be employed, such that the beamforming weights contained in the vector $w=A(\theta_1, \lambda_{DL})$, where $\theta_1$ is the DOA with the maximum power, or the beamforming weights are computed using Method 3 described above, where $w=\tilde{U}_1$, and $\tilde{U}_1$ is the principle eigenvector.

When the downlink transmission scheme is space-time coding with beamforming, Methods 2, 3 or 8 described above are useful. When the downlink transmission scheme is spatial multiplexing with beamforming, the Methods 3, 7 or 8 are useful.

The techniques for computing beamforming weight vectors described herein significantly improve the downlink beamforming performance with low computation complexity, particularly when accurate downlink channel coefficients are not directly available because there is no feedback information sent by a MS to the BS.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at a plurality of antennas of a first wireless communication device, receiving one or more signals transmitted by a second wireless communication device in a first frequency band;
   computing a set of candidate beamforming weight vectors using each of the plurality of methods to produce a plurality of sets of candidate beamforming weight vectors without feedback information from the second wireless communication device about a wireless link from the first wireless communication device to the second wireless communication device;
   computing a correlation rate and predicted average beamforming performance among candidate beamforming weight vectors within each set; and
   selecting one of the plurality of sets of candidate beamforming weight vectors based on a degree of correlation and predicted average beamforming performance among its candidate beamforming weight vectors; and
   applying the selected one of the plurality of sets of candidate beamforming weight vectors to multiple signal streams to beamform the multiple signal streams for transmission to the second wireless communication device in a second frequency band.

2. The method of claim 1, wherein computing beamforming weight vectors comprises computing a plurality of beamforming weight vectors in each candidate set of beamforming weight vectors, and wherein applying comprises applying the selected one of the plurality of sets of candidate beamforming weight vectors to corresponding ones of the multiple signal streams for beamforming the multiple signal streams to the second device.

3. The method of claim 1, wherein computing the beamforming weight vectors comprises computing an estimated uplink channel covariance matrix from the signals received at the plurality of antennas, and computing a norm of the estimated uplink channel covariance matrix.

4. The method of claim 1, wherein computing the beamforming weight vectors comprises computing direction of arrival data associated with the signals received at the plurality of antennas, generating data for a column vector $A(\theta, \lambda)$ that represents a response vector associated with the signals received at the plurality of antennas for each of a plurality of direction of arrivals $\{\theta_1, \theta_2, \ldots, \theta_L\}$, where $\lambda$ is the carrier wavelength of the one more receive signals, and setting the beamforming weight vectors based on elements of the response vector for at least one the plurality of direction of arrivals.

5. The method of claim 1, wherein computing the beamforming weight vectors comprises computing direction of arrival data associated with the signals received at the plurality of antennas, computing a covariance matrix associated with the direction of arrival data, computing a singular value decomposition from the covariance matrix to obtain a plurality of eigenvectors of the new covariance matrix, and setting the beamforming weight vectors to values based on multiple eigenvectors of the covariance matrix.

6. The method of claim 1, wherein computing the beamforming weight vectors comprises computing an average uplink channel covariance from the signals received at the plurality of antennas, computing eigenvectors of the average uplink channel covariance matrix, and setting the beamforming weight vectors to values based on multiple eigenvectors of the average uplink channel covariance matrix, or a linear combination of the eigenvectors of the average uplink channel covariance matrix.

7. The method of claim 1, wherein computing the beamforming weight vectors comprises computing an average uplink channel covariance from the signals received at the plurality of antennas, computing an estimated downlink channel covariance from the average uplink channel covariance and a transformation matrix that is based on the number of antennas of the first device, the spacing of the antennas at the first wireless communication device and a number of spatial sectors, computing eigenvectors of the estimated downlink channel covariance matrix, and setting the beamforming weight vectors to values based on multiple eigenvectors of the average downlink channel covariance.

8. The method of claim 1, wherein computing the beamforming weight vectors comprises computing an estimate of maximum direction of arrivals associated with the signals received at the plurality of antennas and complex-valued projections of the maximum direction of arrivals, applying a group of random variation factors $\{f_k\}_{k=1}^{K}$ to the complex-valued projection and maximum direction of arrivals, and computing the beamforming weight vectors from the maximum direction of arrivals and the complex-valued projections.

9. The method of claim 1, wherein computing the beamforming weight vectors comprises computing an average uplink channel covariance from the signals received at the plurality of antennas, computing J maximum estimated channel taps in a time domain h=[$h_1$ $h_2$ ... $h_J$] with the time delays τ=[$\tau_1$ $\tau_2$ ... $\tau_J$] from the average uplink channel covariance, applying a group of complex random factors $\{g_k\}_{k=1}^{J}$ to the estimated channel taps and time delays, and computing the beamforming weight vectors using the estimated channel taps and time delays.

10. The method of claim 1, and further comprising computing an estimated uplink channel covariance matrix from the signals received at the plurality of antennas, computing the beamforming weight vectors from the estimated uplink channel covariance matrix, computing a new covariance matrix from the beamforming weights, computing a singular value decomposition of the new covariance matrix to produce a plurality of eigenvectors and setting values for the beamforming weight vectors based on multiple eigenvectors.

11. The method of claim 1, and further comprising prioritizing the sets of candidate beamforming weight vectors by correlation rate and predicted average beamforming performance such that the set of candidate beamforming weight vectors with a lowest correlation and best predicted average beamforming performance is given a highest priority and the set of candidate beamforming weight vectors with a highest correlation is given a lowest priority.

12. An apparatus comprising:
 a plurality of antennas;
 a receiver that is configured to process signals received at the plurality of antennas, which signals were transmitted in a first frequency band by another communication apparatus;
 a controller coupled to the receiver, wherein the controller is configured to:
  compute a set of candidate beamforming weight vectors using each of the plurality of methods to produce a plurality of sets of candidate beamforming weight vectors without feedback information from the other communication apparatus about a wireless link from the plurality of antennas to the other communication apparatus;
  compute a correlation rate and predicted average beamforming performance among candidate beamforming weight vectors within each set; and
  select one of the plurality of sets of candidate beamforming weight vectors based on a degree of correlation and predicted average beamforming performance among its candidate beamforming weight vectors; and
 a transmitter coupled to the controller, wherein the transmitter is configured to apply the selected one of the plurality of sets of candidate beamforming weight vectors to multiple signal streams to beamform multiple signal streams for transmission in a second frequency band via the plurality of antennas to the other communication apparatus.

13. The apparatus of claim 12, wherein the controller is configured to compute a plurality of beamforming weight vectors in each candidate set of beamforming weight vectors, and wherein the transmitter is configured to apply the selected one of the plurality of sets of candidate beamforming weight vectors to corresponding ones of the multiple signal streams for beamforming the multiple signal streams to the other communication apparatus.

14. The apparatus of claim 12, wherein the controller is configured to compute the beamforming weight vectors by computing direction of arrival data associated with signals received at the plurality of antennas, generating data for a column vector A(θ,λ) that represents a response vector associated with the signals received at the plurality of antennas for each of a plurality of direction of arrivals $\{\theta_1, \theta_2, \ldots, \theta_L,\}$, where λ is the carrier wavelength of the one more receive signals, and setting the beamforming weight vectors based on elements of the response vector for at least one the plurality of direction of arrivals.

15. The apparatus of claim 12, wherein the controller is configured to compute the beamforming weight vectors by computing an estimate of maximum direction of arrivals associated with the signals received at the plurality of antennas and complex-valued projections of the maximum direction of arrivals, applying a group of random variation factors $\{f_k\}_{k=1}^{K}$ to the complex-valued projection and direction of arrivals, and computing the beamforming weight vectors from the maximum direction of arrivals and the complex-valued projections.

16. The apparatus of claim 12, wherein the controller is configured to compute the beamforming weight vectors by computing an average uplink channel covariance matrix from the signals received at the plurality of antennas, computing eigenvectors of the average uplink channel covariance matrix, and setting the beamforming weight vectors to values based on multiple eigenvectors of the average uplink channel covariance matrix, or a linear combination of the eigenvectors of the average uplink channel covariance matrix.

17. The apparatus of claim 12, wherein the controller is further configured to compute an estimated uplink channel covariance matrix from the signals received at the plurality of antennas, compute the beamforming weight vectors from the estimated uplink channel covariance matrix, compute a new covariance matrix from the beamforming weight vectors, compute a singular value decomposition of the new covariance matrix to produce a plurality of eigenvectors and set values for the beamforming weight vectors based on multiple eigenvectors.

18. The apparatus of claim 12, wherein the controller is further configured to prioritize the sets of candidate beamforming weight vectors by correlation rate and predicted average beamforming performance such that the set of candidate beamforming weight vectors with a lowest correlation and best predicted average beamforming performance is given a highest priority and the set of candidate beamforming weight vectors with a highest correlation is given a lowest priority.

19. One or more tangible processor readable storage media storing instructions for execution by a processor and when executed operable to:
  compute a set of candidate beamforming weight vectors using each of the plurality of methods to produce a plurality of sets of candidate beamforming weight vectors without feedback information from the second device about a wireless link from the first device to the second device;
    compute a correlation rate and predicted average beamforming performance among candidate beamforming weight vectors within each set; and
  select one of the plurality of sets of candidate beamforming weight vectors based on a degree of correlation and predicted average beamforming performance among its candidate beamforming weight vectors; and
  apply the selected one of the plurality of sets of candidate beamforming weight vectors to multiple signal streams to beamform the multiple signal streams for transmission to the second device in a second frequency band.

20. The processor readable storage media of claim 19, wherein the instructions that are operable to compute the beamforming weight vectors comprise instructions operable to compute a plurality of beamforming weight vectors in each candidate set of beamforming weight vectors, and wherein the instructions that are operable to apply comprise instructions operable to apply the selected one of the plurality of sets of candidate beamforming weight vectors to corresponding ones of the multiple signal streams for beamforming the multiple signal streams to the other second device.

21. The processor readable storage media of claim 19, wherein the instructions operable to compute the beamforming weight vectors comprise instructions operable to compute an average uplink channel covariance matrix from the signals received at the plurality of antennas of the first device, compute eigenvectors of the average uplink channel covariance matrix, and set the beamforming weight vectors to values based on multiple eigenvectors of the average uplink channel covariance matrix, or a linear combination of the eigenvectors of the average uplink channel covariance matrix.

22. The processor readable storage media of claim 19, and further comprising instructions operable to compute an estimated uplink channel covariance matrix from the signals received at the plurality of antennas, compute the beamforming weight vectors from the estimated uplink channel covariance matrix, compute a new covariance matrix from the estimated multiple beamforming weight vectors, compute a singular value decomposition of the new covariance matrix to produce a plurality of eigenvectors and set values for the beamforming weight vectors based on multiple eigenvectors.

23. The processor readable storage media of claim 19, and further comprising instructions operable to prioritize the sets of candidate beamforming weight vectors by correlation rate and predicted average beamforming performance such that the set of candidate beamforming weight vectors with a lowest correlation and best predicted average beamforming performance is given a highest priority and the set of candidate beamforming weight vectors with a highest correlation is given a lowest priority.

* * * * *